(12) United States Patent
Pu et al.

(10) Patent No.: US 7,560,169 B2
(45) Date of Patent: Jul. 14, 2009

(54) WOOD COMPOSITE MATERIAL CONTAINING BALSAM FIR

(75) Inventors: Jianhua Pu, Bishop, GA (US); Eric N. Lawson, Hull, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 75 days.

(21) Appl. No.: 11/457,852

(22) Filed: Jul. 17, 2006

(65) Prior Publication Data

US 2008/0014427 A1 Jan. 17, 2008

(51) Int. Cl.
*B32B 21/04* (2006.01)
*B29C 47/00* (2006.01)
*C08L 97/02* (2006.01)

(52) U.S. Cl. .................. 428/537.1; 524/13; 524/14; 264/109

(58) Field of Classification Search ............... None
See application file for complete search history.

(56) References Cited

U.S. PATENT DOCUMENTS

| | | |
|---|---|---|
| 3,303,089 A | 2/1967 | Roubickek et al. |
| 3,795,574 A | 3/1974 | Kalisch et al. |
| 4,241,133 A | 12/1980 | Lund et al. |
| 4,337,710 A | 7/1982 | Haataja et al. |
| 4,440,708 A | 4/1984 | Haataja et al. |
| 4,610,913 A | 9/1986 | Barnes |
| 4,790,966 A | 12/1988 | Sandberg et al. |
| 4,807,413 A | 2/1989 | Randall |
| 4,960,553 A | 10/1990 | DeBruine et al. |
| 5,002,713 A | 3/1991 | Palardy et al. |
| 5,142,994 A | 9/1992 | Sandberg et al. |
| 5,234,747 A | 8/1993 | Walser et al. |
| 5,272,852 A | 12/1993 | Fortin et al. |
| 5,424,382 A | 6/1995 | Meister et al. |
| 5,741,875 A | 4/1998 | Meister et al. |
| 5,852,069 A | 12/1998 | Meister et al. |
| 5,888,620 A | 3/1999 | Grenier |
| 6,013,774 A | 1/2000 | Meister et al. |
| 6,025,053 A | 2/2000 | Grenier |
| 6,511,567 B1 | 1/2003 | Ruggie et al. |
| 6,569,540 B1 | 5/2003 | Preston et al. |
| 6,592,792 B2 | 7/2003 | Haataja |
| 6,635,208 B2 | 10/2003 | Haataja |
| 6,756,105 B1 | 6/2004 | Haataja |
| 6,761,844 B1 | 7/2004 | Haataja |
| 6,773,791 B1 | 8/2004 | Ruggie et al. |
| 6,800,352 B1 | 10/2004 | Hejna et al. |
| 6,818,317 B2 | 11/2004 | Hejna et al. |
| 6,830,797 B2 | 12/2004 | Haataja |
| 6,843,946 B1 | 1/2005 | Haataja |
| 6,846,553 B2 | 1/2005 | Haataja |
| 6,916,523 B2 | 7/2005 | Haataja |
| 2004/0028934 A1 | 2/2004 | Preston et al. |
| 2005/0142328 A1 | 6/2005 | Haataja |

*Primary Examiner*—D. Lawrence Tarazano
*Assistant Examiner*—Brett A Crouse

(57) ABSTRACT

A wood composite board comprising balsam fir strands is disclosed.

7 Claims, No Drawings

WOOD COMPOSITE MATERIAL CONTAINING BALSAM FIR

BACKGROUND OF THE INVENTION

Wood is a common material used in residential, commercial, and industrial constructions as structural panels, cabinets, and door components as well as other functions. Even today, after the development of several new types of composite materials, wood remains one of the most widely-used structural materials because of its excellent strength and stiffness, pleasing aesthetics, good insulation properties and easy workability.

However, in recent years the cost of solid timber wood has increased dramatically as its supply shrinks due to the gradual depletion of old-growth and virgin forests. It is particularly expensive to manufacture doors from such material because typically less than half of the harvested logs is converted to solid sawn lumber, the remainder being discarded as scrap.

Accordingly, because of both the cost of high-grade solid wood as well as a heightened emphasis on conserving natural resources, wood-based alternatives to natural solid wood lumber have been developed that make more efficient use of harvested wood and reduce the amount of wood discarded as scrap. Plywood, particle board and oriented strand board ("OSB") are examples of wood-based composite alternatives to natural solid wood lumber that have replaced natural solid wood lumber in many structural applications in the last seventy-five years.

While these wood-based composites use wood more efficiently, they have the disadvantage of not always being able to make full use of the available wood supply in the wood baskets adjacent to wood composite manufacturing plants. For example, when the wood supply includes material from multiple wood species, attempts to use the multiple wood species can cause problems, particularly an undesirable variation in product properties such as stiffness and strength, due to the inherent characteristics of the wood species. For instance, if two or more species are used that have different characteristics in their anatomical, physical, and mechanical attributes, it will add difficulties in the manufacturing process and in the end it will possibly undermine the quality of the product.

Given the foregoing, there is a need in the art for wood composite materials made from wood species that are commonly available in known wood baskets which may be blended together to form wood composite materials having performance characteristics suitable for a wide range of uses.

BRIEF SUMMARY OF THE INVENTION

The present invention includes a wood composite board comprising balsam fir (*Abies balsamea*) strands. The wood composite preferably contains about 1 wt % to about 99 wt % of the balsam fir strands.

DETAILED DESCRIPTION OF THE INVENTION

All parts, percentages and ratios used herein are expressed by weight unless otherwise specified. All documents cited herein are incorporated by reference.

As used herein, "wood" is intended to mean a cellular structure, having cell walls composed of cellulose and hemicellulose fibers bonded together by lignin polymer. It should further be noted that the term "wood" encompasses lignocellulosic material generally.

By "wood composite material" it is meant a composite material that comprises one or more wood species and one or more wood composite additives, such as adhesives or waxes. The wood is typically in the form of veneers, flakes, strands, wafers, particles, and chips. Non-limiting examples of wood composite materials include oriented strand board ("OSB"), waferboard, particle board, chipboard, medium-density fiberboard, plywood, parallel strand lumber, oriented strand lumber, and laminated strand lumbers. Common characteristics of the wood composite materials are that they are composite materials comprised of strands and ply veneers bonded with polymeric resin and other special additives. As used herein, "flakes", "strands", "chips", "particles", and "wafers" are considered equivalent to one another and are used interchangeably. A non-exclusive description of wood composite materials may be found in the Supplement Volume to the Kirk-Rothmer Encyclopedia of Chemical Technology, pp 765-810, $6^{th}$ Edition.

The present invention is directed to wood composite boards comprising balsam fir strands. By "balsam fir strands" it is meant strands made from trees of the species *Abies balsamea* commonly known as "balsam fir". *Abies balsamea* is a northern growing species of tree found in the Northeastern United States in states such as Maine, Vermont, New Hampshire, and New York. It can also be found in parts of the upper Midwest including Michigan, Wisconsin, and Minnesota, although the greatest extent of its range is central to eastern Canada. While the wood is widely used among model makers and hobbyists, and apparently makes good paper, it is of marginal use as a lumber material because of its low density, which typically is indicative of poor physical properties such as strength, stiffness, and nail withdrawal strength, among others. Because of this, even though the trees are widely available in its native habitat, the lumber is typically only used in light construction.

Nail withdrawal strength refers to the ability of a material to "hold" a nail when a pullout force is exerted on the nail. For a material to be used in building structures especially in residential, commercial, and industrial applications, the importance of good nail withdrawal strength cannot be overstated. When a wood composite board is used for roof or wall sheathing, it is critical that the wood composite have sufficient nail withdrawal strength so that roofing paper, shingles, and house wrap affixed to the wood composite board with nails or similar fasteners will stay attached to the board. Loose nails may allow a panel to become loosened from rafters during high winds, possibly exposing the interior of a building to outside weather conditions. In particularly severe cases, such as hurricanes or very high speed winds, detaching of the panel from the rafters adds to the lift force already being experienced by the panel and may potentially cause the complete removal of the panel possibly resulting in the total destruction of the house or at the very least transforming the panel into a highly dangerous projectile that could potentially cause serious injury and/or property damage.

Although less serious in terms of physical safety (but more typical in terms of homeowner satisfaction) nail withdrawal strength is also important when attaching a subfloor panel into the joists underneath, and for nailing a finishing floor (such as hardwood flooring) to the subfloor panel. Poor nail withdrawal strength will result in loose nails, which cause squeaks and popping sounds in floors as a person walks across the surface-for example, if the nail has risen from the surface of the panel, the panel will slide up and down the nail, causing the typical and detested squeaking sounds.

Given the poor nail withdrawal strength of *Abies balsamea*, one would consequently also expect that wood composite board made with the balsam fir material would have a low nail holding capacity as well, in addition to low bending stiffness and strength as well. There are yet other potential complications resulting from the use of balsam fir in the manufacture of wood composite boards. For example, balsam fir may have a higher concentration of wood extractives resulting in higher dryer emissions as compared to Aspen and other hardwood species. Moreover, the drying characteristics of balsam fir strands may differ from those of the currently used species, and thus may present challenges for consistent moisture control in the combined furnishes. Poor strand geometry and higher fines generation could also result when incorporating balsam fir into the existing wood mix if proper process adjustments are not in place. Finally, it is important to take the appropriate steps to obtain a quality appearance of the finished products in spite of possible discoloration caused by the use of a species such as balsam fir.

The boards or panels prepared according to the present invention may be made in the form of a variety of different materials, such as wood or wood composite materials, such as oriented strand board ("OSB"). In addition to balsam fir, OSB panels may also incorporate strands from other wood species materials including naturally occurring hardwood or softwood species, singularly or mixed, whether such wood is dry (having a moisture content of between 2 wt % and 12 wt %) or green (having a moisture content of between 30 wt % and 200 wt %). Suitable other wood species in addition to balsam fir include pine species such as Loblolly pine, Virginia Pine, slash pine, Short leaf pine, and long leaf pines, as well as Aspen or other hardwood species similar to Aspen. The wood boards of the present invention will include about 1 wt % to about 99 wt % balsam fir wood, and about 99 wt % to about 1 wt % of other wood species.

Typically, the raw wood starting materials, either virgin or reclaimed, are cut into strands, wafers or flakes of desired size and shape, which are well known to one of ordinary skill in the art. The strands are preferably more than 2 inches long, more than 0.3 inch wide, and less than 0.25 inch thick. While not intended to be limited by theory, it is believed that longer strands, i.e., longer than about 6 inches, improves the final product mechanical strength by permitting better alignment. It is also known that uniform-width strands are preferred for better product quality. Uniform strand geometry allows a manufacturer to optimize the manufacturer's process for a particular strand size selected. For instance, if all the strands were 4 inches×1 inch, then the orienter could be optimized to align those strands within a single layer. If strands that were 1 inch long and 0.25 inch wide were added, some of those could slide thru the orienters sideways. Cross-oriented strands lower the overall mechanical strength/stiffness of the product.

After the strands are cut they are dried in an oven to a moisture content of about 1 to 20%, preferably between 2 to 18%, more preferably from 3 to about 15%, and then coated with one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat. In a conventional process for forming a multi-layered mat, the coated wood materials are spread on a conveyor belt in a series of two or more, preferably three layers. The strands are positioned on the conveyor belt as alternating layers where the "strands" in adjacent layers are oriented generally perpendicular to each other. It is understood by those skilled in the art that the products made from this process could have the strands aligned all in the same direction or randomly without a particular alignment.

Various polymeric resins, preferably thermosetting resins, may be employed as binders for the wood flakes or strands. Suitable polymeric binders include isocyanate resin, urea-formaldehyde, phenol formaldehyde, melamine formaldehyde ("MUF") and the co-polymers thereof. Isocyanates are the preferred binders, and preferably the isocyanates are selected from the diphenylmethane-p,p'-diisocyanate group of polymers, which have NCO— functional groups that can react with other organic groups to form polymer groups such as polyurea, —NCON—, and polyurethane, —NCOO—. 4,4-diphenyl-methane diisocyanate ("MDI") is preferred. A suitable commercial pMDI product is Rubinate 1840 available from Huntsman, Salt Lake City, Utah, and Mondur 541 pMDI available from Bayer Corporation, North America, of Pittsburgh, Pa. Suitable commercial MUF binders are the LS 2358 and LS 2250 products from the Dynea corporation, Helsinki, Finland.

The binder concentration is preferably in the range of about 1.5 wt % to about 20 wt %, more preferably about 2 wt % to about 10 wt %. A wax additive is commonly employed to enhance the resistance of the OSB panels to moisture penetration. Preferred waxes are slack wax or an emulsion wax. The wax loading level is preferably in the range of about 0.5 to about 2.5 wt %.

The invention will now be described in more detail with respect to the following, specific, non-limiting examples.

EXAMPLES

Wood composite boards were prepared according to the present invention and according to the prior art in order to demonstrate the superior wood performance characteristics of wood boards prepared according to the present invention. Aspen logs and balsam fir logs were obtained for use. The logs were then cut into strands, the strands dried, and the strands pressed into panels having varied concentrations of aspen and balsam fir strands as set forth in table I, below. The panels included surface and core layers, wherein the strands in the surface and core layers are oriented 90° with respect to each other. The strands themselves are of between 1 to 6 inches in length, 0.25 to 4 inches wide and 0.005 to 0.150 inch thick. The panels contained 5 wt % pMDI resin. The pMDI resin was Rubinate 1840 pMDI available from the Huntsman Corporation, Salt Lake City, Utah. The panels also contained 1.5 wt % slack wax.

The panels were then cut into smaller sizes and the density and nail withdrawal strength measured according to the protocol specified in ASTM D1037 (see *Nail Withdrawal Test*, Paragraphs 47-53). The results are set forth in table I, below.

TABLE I

| % Balsam Fir | % Aspen | Density (pcf) | Nail Withdrawal (lbf) | Nail Withdrawal per inch thick (lbs/in) | Nail Withdrawal per inch thick (lbs/in)[1] |
|---|---|---|---|---|---|
| 0 | 100 | 40 | 102 | 126 | 122 |
| 25 | 75 | 39.5 | 116 | 154 | 152 |
| 50 | 50 | 40.8 | 127 | 169 | 162 |
| 75 | 25 | 39.4 | 123 | 164 | 162 |
| 100 | 0 | 40.4 | 138 | 184 | 178 |

[1] Normalized to 39 pcf of density

As can be seen in Table I, the OSB board prepared according to the present invention (those having a balsam fir content of from about 25% to about 100%) actually had superior nail withdrawal strength than the samples prepared according to the prior art (the board with a balsam fir content of 0%). Thus, increasing the balsam fir content actually increases the nail withdrawal strength. Such a result would be surprising and unexpected to a person of ordinary skill in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wood composite board comprising wood strands wherein the wood strands comprise an amount of balsam fir strands effective to increase nail withdrawal strength of the board relative to a board without balsam fir strands, wherein the wood strands comprise from about 1 wt % to about 99 wt % balsam fir strands and about 99 wt % to about 1 wt % of aspen wood strands.

2. The wood composite board according to claim 1, wherein the amount of the balsam fir strands is about 25 wt % to about 99 wt % of the wood strands.

3. The wood composite board according to claim 1, wherein the wood composite board has a density of about 15 lbs/ft$^3$ to about 50 lbs/ft$^3$.

4. The wood composite board according to claim 1, wherein the wood composite board is in the form of an oriented strand board.

5. The wood composite board according to claim 1, wherein the wood composite board comprises from about 1 wt % to about 20 wt % of polymeric binders.

6. The wood composite board according to claim 1, wherein the nail withdrawal strength according to ASTM D1037 of the board is at least about 116 lbf for an about 39 pcf density board.

7. The wood composite board according to claim 1, wherein the increased nail withdrawal strength is at least about 14% greater than the nail withdrawal strength of a board without balsam fir strands.

\* \* \* \* \*